H. WILCOX.
NAIL CLIPPER.
APPLICATION FILED AUG. 23, 1907.
898,808.
Patented Sept. 15, 1908.
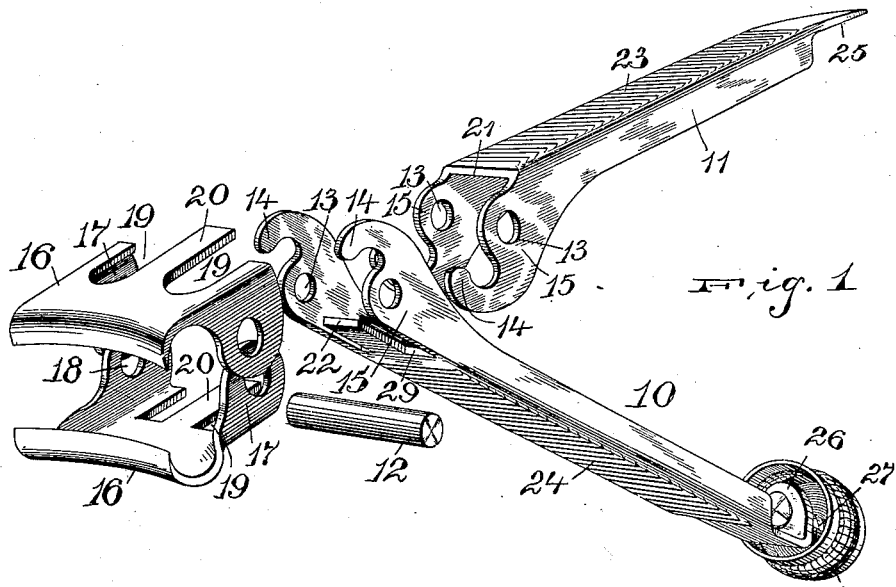
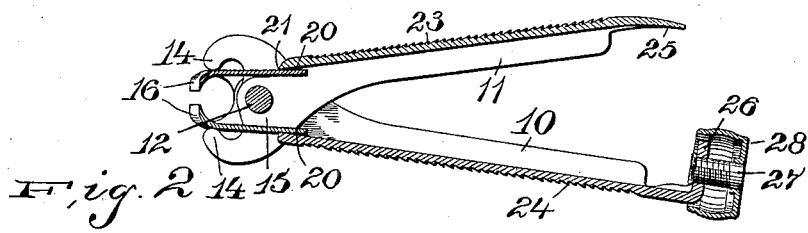
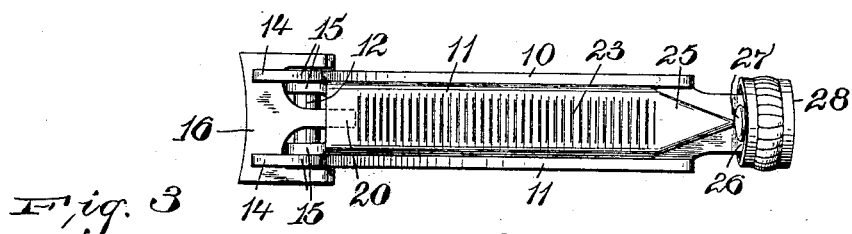
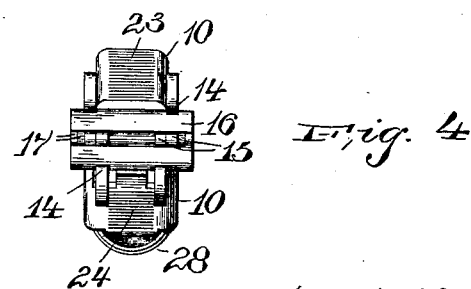
WITNESSES:
E. A. Pell
S. C. Rogers
INVENTOR
Henry Wilcox,
BY
Wm. H. Camfield.
ATTORNEY.

UNITED STATES PATENT OFFICE.

HENRY WILCOX, OF NEWARK, NEW JERSEY, ASSIGNOR, BY MESNE ASSIGNMENTS, TO S. CHARLES HIRSCHBERG, OF NEW YORK, N. Y.

NAIL-CLIPPER.

No. 898,808.  Specification of Letters Patent.  Patented Sept. 15, 1908.

Application filed August 23, 1907. Serial No. 389,763.

*To all whom it may concern:*

Be it known that I, HENRY WILCOX, a citizen of the United States, residing at Newark, in the county of Essex and State of New Jersey, have invented certain new and useful Improvements in Nail-Clippers; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a nail clipper comprising a pair of cutter-blades pivotally mounted on a pin and having rearwardly projecting spring tongues, combined with a pair of levers pivoted intermediate of their ends on the pin, one end of each lever forming a handle portion, and each handle portion engaging the spring tongue of a cutter-blade, the projecting end of each lever engaging the outside of the cutter-blade, other than the blade engaged by its handle portion. The levers thus operate on one side of the pivot to force the cutting edges of the cutter-blades together, and are in turn operated by the spring tongues of the cutter-blades to be normally slightly apart.

The invention also provides a locking means, on the ends of the handle portions of the levers, to hold the handles together.

Another new feature of the invention is the arrangement of parts that permits the levers to be swung until they are in line, to form a comparatively long handle portion to be grasped by the hand when the nail cleaner, on the projecting end of one of the handle portions, is used.

The invention is illustrated in the accompanying drawing, in which

Figure 1 is a perspective view of the parts of the clipper when separated. Fig. 2 is a central longitudinal section of the clipper assembled. Fig. 3 is a top view of the clipper, and Fig. 4 is a front view of the same.

The clipper is composed of two levers, a lower one 10, and an upper one 11, which are pivoted near one end on a pin 12. The levers form, on their longest projecting parts, handle portions and are substantially U-shaped in cross-section, this form being preferred on account of the stiffness it imparts, but the contour and form of the handle portions can be changed. The levers are provided with cheek-pieces 15, spaced apart transversely, which are perforated at 13 to receive the pin 12. The short end of each lever is formed into a finger or hook 14 to engage the outside of the cutter-blades. The cutter-blades 16 have the ears 17 which are perforated at 18 so that the cutter-blades can be pivoted on the pin 12 and on the outside of the levers 10 and 11. Each cutter-blade is notched at 19 to form the central and rearwardly extending tongue 20, and also to allow the passage of the cheek-pieces 15 of the levers. The tongues 20, of the cutter-blades, project rearwardly beyond the pivotal pin 12, the one on the upper cutter-blade being adapted to be engaged by the transverse bearing surface 21 of the lever 11, and the one on the lower blade being adapted to be engaged by the bearing surface 22 of the lever 10.

The top and bottom of the assembled cutter-blades are engaged by the fingers 14, and when the handle portions of the levers 10 and 11 are operated, the opposed cutting edges of the blades 16 are brought together. When the pressure on the handle portions is removed, the spring tongues 20 act to force the handle portions of the levers apart, assisted by the tendency of the cutting edges to separate on account of the blades 16 being themselves made of spring metal. These spring tongues act to normally hold the handle portions of the levers slightly apart, and consequently the cutting edges of the cutter-blades are open for the reception of the article to be cut. The levers are preferably supplied with the file-teeth 23 and 24.

The end of the lever 10 is narrowed and bent up to form a standard 26. A screw 27 is arranged in a screw-threaded perforation in the standard, and is rigidly secured to a cylindrical hood 28. When the handle portions are brought close together, the hood 28 can be screwed up to engage the end of the nail cleaner 25, which is on the end of the lever 11, and thus lock the parts together. The lever 10 has recesses 29 therein to allow the passage of the cheek-pieces 15 of the lever 11, as the lever 11 is the narrowest, as will be seen from Fig. 4. This construction permits the spreading of the levers until they are in line, so as to furnish a good grip when the nail cleaner is used, as a comparatively long handle is the result.

Having thus described my invention, what I claim is:—

1. A nail clipper comprising a pair of levers pivoted together near one end, and a pair of cutter-blades pivotally arranged on the pivot of the levers and having opposed cutting edges, each lever forming a handle portion on its long end, the long end of each lever engaging a cutter-blade on one side of the pivot and the short end of each lever engaging the outside of the cutting blade opposed to the one engaged by its long end.

2. A nail clipper comprising a pair of levers pivoted together near one end, a pair of cutter-blades pivotally arranged on the pivot of the levers and having opposed cutting edges, each lever forming a handle portion on its long end, the long end of each lever engaging a cutter-blade on one side of the pivot and the short end of each lever engaging the outside of the cutting blade opposed to the one engaged by its long end, and means on the ends of the handle portions for locking them together.

3. A nail clipper comprising a pair of levers crossed and pivoted near one end, the long ends of the levers forming handle portions, a pair of cutter-blades having opposed cutting edges on one end and having spring tongues on the other end, the blades being pivoted between the ends, each lever engaging the spring tongue of one cutter-blade and the cutting end of the opposed cutter-blade, whereby the levers actuate the cutter-blades, and the cutter-blades tend to normally throw the levers slightly apart.

4. A nail clipper comprising a pair of levers crossed and pivoted near one end, a pair of cutters pivoted intermediate of their ends and recessed to receive the levers, one end of each cutter-blade forming a cutting edge, and the other end having a projecting spring tongue, each lever engaging alternately the tongue on one blade and the outside of the cutting end of the other blade.

5. A nail clipper comprising a pair of levers crossed and pivoted near one end, each lever having cheek-pieces, a pair of cutter-blades pivoted on the pivot of the levers and having recesses for the passage of the cheek-pieces, the cutter-blades having opposed cutting edges on one end and spring tongues on the other end, a transverse portion on each lever to engage the outside of the spring tongue of one cutter-blade, each lever engaging the outside of the cutting end of the blade other than that engaged by its transverse portion, and means for locking the levers together in their closed position.

6. A nail clipper comprising a pair of levers crossed and pivoted near one end, a pair of cutter-blades having opposed cutting edges on one end and projecting spring tongues on the other end, ears on the cutter-blades intermediate of their ends, the ears having perforations for the reception of the pivotal pin, the short ends of the levers engaging the outside of the cutting end of the cutter-blades, the long end of the levers being substantially U-shaped in cross-section and forming transverse bearing portions at the end of the U-shaped portion, the transverse bearing portion engaging the outside of the spring tongue of the cutter-blade opposed to the blade engaged by its short end, and means for locking the handle portions together in their closed position.

7. A nail clipper comprising a pair of levers crossed and pivoted near one end, a pair of cutter-blades having opposed cutting edges on one end and projecting spring tongues on the other end, ears on the cutter-blades intermediate of their ends, the ears having perforations for the reception of the pivotal pin, the short ends of the levers engaging the outside of the cutting end of the cutter-blades, the long ends of the levers forming handles and being substantially U-shaped in cross-section and forming transverse bearing portions at the end of the U-shaped portion, the transverse bearing portion engaging the outside of the spring tongue of the cutter-blade opposed to the blade engaged by its short end, and locking means secured to the end of one handle portion and adapted to engage the end of the other handle portion when the handles are brought together.

8. A nail clipper comprising a pair of levers, each lever consisting of a substantially U-shaped handle portion and having projecting cheek-pieces with hooks on the end thereof, the cheek-pieces being perforated, a pin arranged in the perforation of the cheek-pieces, and a pair of cutter-blades having ears on the outside of the cheek-pieces, the ears being perforated to receive the pin, the cutter-blades having opposed cutting edges on one end, the other end of the cutter-blades being recessed to receive the cheek-pieces of the levers and to form rearwardly projecting spring tongues, the transverse portion of each lever engaging the spring tongue of one cutter-blade, and the hooks of the same lever engaging the cutting end of the other cutter-blade.

9. A nail clipper comprising a pair of pivoted levers, cutter-blades actuated by the levers, the projecting end of one lever being bent up to form a standard having a screw-threaded perforation, a screw to enter the perforation, a cylindrical hood secured to the screw and adapted to operate it, the hood being adapted to inclose the end of the other lever when the levers are brought together.

10. A nail clipper comprising a pair of pivoted levers, cutter-blades actuated by the levers, the projecting end of one lever being bent up into a standard having a screw-threaded perforation, a screw working in the perforation, a cylindrical hood secured to the screw and inclosing the standard, and a triangular nail cleaner on the end of the second lever, the nail cleaner being adapted to be inclosed by the cylindrical hood when the levers are brought close together and the hood is rotated to operate the screw.

11. A nail clipper comprising a pair of levers pivoted near one end, cutter-blades actuated by the levers, and a hood attached to one lever and adapted to envelop the other lever and conceal and cover the ends of both levers when the levers are brought together.

12. A nail clipper comprising a pair of levers pivoted near one end, cutter-blades actuated by the levers, and a hood arranged to move longitudinally on and be attached to one lever and adapted to engage the outside of the other lever when the levers are brought together, and concealing the ends of both levers when they are shut.

13. A nail clipper comprising a pair of levers pivoted near one end, the small ends of the levers having fingers thereon, and a pair of cutter-blades pivoted on the pivot of the levers and adapted to be actuated by the fingers of the levers.

14. A nail clipper comprising a pair of levers pivoted near one end, and a pair of cutter-blades adapted to be actuated by the engagement of the short ends of the levers with the outside of the cutter-blades, the cutter-blades being pivoted to the pivot of the levers and thereby swinging on a positive pivot to keep their cutting edges in register.

In testimony, that I claim the foregoing, I have hereunto set my hand this 15th day of August 1907.

HENRY WILCOX.

Witnesses:
WM. H. CAMFIELD,
E. A. PELL.